US012605902B2

(12) United States Patent
Oda

(10) Patent No.: US 12,605,902 B2
(45) Date of Patent: Apr. 21, 2026

(54) WELDED FILM AND METHOD OF PRODUCING SAME

(71) Applicant: AGC INC., Tokyo (JP)

(72) Inventor: Koichi Oda, Chiyoda-ku (JP)

(73) Assignee: AGC INC., Tokyo (JP)

( * ) Notice: Subject to any disclaimer, the term of this patent is extended or adjusted under 35 U.S.C. 154(b) by 120 days.

(21) Appl. No.: 18/460,761

(22) Filed: Sep. 5, 2023

(65) Prior Publication Data

US 2023/0405942 A1      Dec. 21, 2023

Related U.S. Application Data

(63) Continuation of application No. PCT/JP2022/002480, filed on Jan. 24, 2022.

(30) Foreign Application Priority Data

Mar. 17, 2021      (JP) ................................. 2021-043917

(51) Int. Cl.
  *B29C 65/50*      (2006.01)
  *B29C 65/00*      (2006.01)
  *B29C 65/20*      (2006.01)
  *B29L 7/00*      (2006.01)
(52) U.S. Cl.
  CPC .......... *B29C 65/5042* (2013.01); *B29C 65/20* (2013.01); *B29C 66/12221* (2013.01); *B29C 66/73921* (2013.01); *B29L 2007/008* (2013.01)
(58) Field of Classification Search
  CPC ............... B29C 65/5042; B29C 65/20; B29C 66/12221; B29C 66/73921; B29L 2007/008
  See application file for complete search history.

(56) References Cited

U.S. PATENT DOCUMENTS

2003/0113502 A1 *  6/2003  Tsukada .............. B29C 66/3452
                                                                156/308.2

FOREIGN PATENT DOCUMENTS

| JP | 53-17673 A | 2/1978 |
|----|------------|--------|
| JP | 58-160118 U | 10/1983 |
| JP | 9-207221 A | 8/1997 |
| JP | 2003-313311 A | 11/2003 |

OTHER PUBLICATIONS

International Search Report issued Mar. 29, 2022 in PCT/JP2022/002480 filed on Jan. 24, 2022, 2 pages.

* cited by examiner

*Primary Examiner* — Alicia J Weydemeyer
*Assistant Examiner* — Laura B Figg
(74) *Attorney, Agent, or Firm* — Oblon, McClelland, Maier & Neustadt, L.L.P.

(57) ABSTRACT

A welded film including, at least a first thermoplastic resin film, a second thermoplastic resin film, and a thermoplastic resin film for connection disposed so as to span between the first thermoplastic resin film and the second thermoplastic resin film, wherein the first thermoplastic resin film and the thermoplastic resin film for connection are welded at a first welded portion, and the second thermoplastic resin film and the thermoplastic resin film for connection are welded at a second welded portion, and the welded portions are separated by 2.0 mm or more, or each of the welded portions is separated from an end portion of the corresponding thermoplastic resin film among the two thermoplastic resin films; and a method of producing the welded film.

15 Claims, 4 Drawing Sheets

(a)        (b)

(a)        (b)

(a)        (b)

WELDED FILM AND METHOD OF PRODUCING SAME

CROSS-REFERENCE TO RELATED APPLICATIONS

This application is a continuation of International Application No. PCT/JP2022/002480, filed on Jan. 24, 2022, which claims priority from Japanese Patent Application No. 2021-043917, filed on Mar. 17, 2021. The entire disclosure of each of the above applications is incorporated herein by reference.

TECHNICAL FIELD

The present disclosure relates to a welded film and a method of producing the welded film.

BACKGROUND ART

For films used for agricultural covering materials, membrane structures, and the like, wide width films are usually used. Since there is a limit to the size of industrially produced films, such wide width films are usually produced by connecting plural industrially produced films. As a method for connecting the films, a method of welding plural films by overlapping end portions of the plural films and performing thermocompression bonding, a method of welding plural films by covering end portions of the plural films with a film for connection and performing thermocompression bonding, and the like are known.

For example, Patent Literature 1 proposes, as a method for connecting plural films having a hydrophilized surface on one side, a method of welding plural films by covering end portions of the plural films with a film for connection and performing thermocompression bonding.

CITATION LIST

Patent Literature

Patent Literature 1: Japanese Patent Application Laid-Open (JP-A) No. 2003-313311

SUMMARY OF INVENTION

Technical Problem

In a case in which a welded film welded by a conventional method such as the method described in Patent Literature 1 is stretched for a long time, the connection portions between the films tear in some occasions. In view of such a situation, the present disclosure relates to a welded film of which tearing at a connection portion is suppressed, and a method of producing the welded film.

Solution to Problem

Means for solving the foregoing problem include the following aspects.
(1) A welded film, including, at least:
a first thermoplastic resin film;
a second thermoplastic resin film; and
a thermoplastic resin film for connection disposed so as to span between the first thermoplastic resin film and the second thermoplastic resin film, wherein:

the first thermoplastic resin film and the thermoplastic resin film for connection are welded at a first welded portion, and the second thermoplastic resin film and the thermoplastic resin film for connection are welded at a second welded portion, and
a minimum distance between the first welded portion and the second welded portion is 2.0 mm or more.
(2) The welded film according to (1), wherein a positional relationship between the first thermoplastic resin film or the second thermoplastic resin film, and the first welded portion or the second welded portion, satisfies at least one selected from the group consisting of the following (i) and (ii):
(i) a minimum distance between an end portion of the first thermoplastic resin film at a side of the second thermoplastic resin film and the first welded portion is 0.5 mm or more; and
(ii) a minimum distance between an end portion of the second thermoplastic resin film at a side of the first thermoplastic resin film and the second welded portion is 0.5 mm or more.
(3) The welded film according to (1) or (2), wherein a positional relationship between the first welded portion and the second welded portion satisfies at least one selected from the group consisting of $0<(L_{1b}/L_{1a})<0.99$ and $0<(L_{2b}/L_{2a})<0.99$, wherein:
$L_{1b}$ represents a width of the first welded portion,
$L_{1a}$ represents a total length obtained by adding a minimum distance from an end portion of the first thermoplastic resin film, at a side of the second thermoplastic resin film, to the first welded portion, to the width $L_{1b}$ of the first welded portion,
$L_{2b}$ represents a width of the second welded portion, and
$L_{2a}$ represents a total length obtained by adding a minimum distance from an end portion of the second thermoplastic resin film, at a side of the first thermoplastic resin film, to the second welded portion, to the width $L_{2b}$ of the second welded portion.
(4) A welded film, including, at least:
a first thermoplastic resin film;
a second thermoplastic resin film; and
a thermoplastic resin film for connection disposed so as to span between the first thermoplastic resin film and the second thermoplastic resin film, wherein:
the first thermoplastic resin film and the thermoplastic resin film for connection are welded at a first welded portion, and the second thermoplastic resin film and the thermoplastic resin film for connection are welded at a second welded portion, and
a positional relationship between the first thermoplastic resin film or the second thermoplastic resin film, and the first welded portion or the second welded portion, satisfies at least one selected from the group consisting of the following (i) and (ii):
(i) a minimum distance between an end portion of the first thermoplastic resin film at a side of the second thermoplastic resin film and the first welded portion is 0.5 mm or more; and
(ii) a minimum distance between an end portion of the second thermoplastic resin film at a side of the first thermoplastic resin film and the second welded portion is 0.5 mm or more.
(5) The welded film according to (4), wherein a positional relationship between the first welded portion and the second welded portion satisfies at least one selected from the group consisting of $0<(L_{1b}/L_{1a})<0.99$ and $0<(L_{2b}/L_{2a})<0.99$, wherein:

$L_{1b}$ represents a width of the first welded portion, $L_{1a}$ represents a total length obtained by adding a minimum distance from an end portion of the first thermoplastic resin film, at the side of the second thermoplastic resin film, to the first welded portion, to the width $L_{1b}$ of the first welded portion, $L_{2b}$ represents a width of the second welded portion, and $L_{2a}$ represents a total length obtained by adding a minimum distance from an end portion of the second thermoplastic resin film, at the side of the first thermoplastic resin film, to the second welded portion, to the width $L_{2b}$ of the second welded portion.

(6) A welded film, including, at least:

a first thermoplastic resin film;

a second thermoplastic resin film; and a thermoplastic resin film for connection disposed so as to span between the first thermoplastic resin film and the second thermoplastic resin film, wherein:

the first thermoplastic resin film and the thermoplastic resin film for connection are welded at a first welded portion, and the second thermoplastic resin film and the thermoplastic resin film for connection are welded at a second welded portion, and a positional relationship between the first welded portion and the second welded portion satisfies at least one selected from the group consisting of $0<(L_{1b}/L_{1a})<0.99$ and $0<(L_{2b}/L_{2a})<0.99$, wherein:

$L_{1b}$ represents a width of the first welded portion, $L_{1a}$ represents a total length obtained by adding a minimum distance from an end portion of the first thermoplastic resin film, at a side of the second thermoplastic resin film, to the first welded portion, to the width $L_{1b}$ of the first welded portion, $L_{2b}$ represents a width of the second welded portion, and $L_{2a}$ represents a total length obtained by adding a minimum distance from an end portion of the second thermoplastic resin film, at a side of the first thermoplastic resin film, to the second welded portion, to the width $L_{2b}$ of the second welded portion.

(7) The welded film according to any one of (1) to (6), wherein a connection portion has a tensile elongation at break of 150% or more as measured at a tensile speed of 200 mm/min using a dumbbell-shaped test piece having a gauge line distance of 40 mm in accordance with JIS K6732:2006.

(8) The welded film according to any one of (1) to (7), wherein a ratio of a thickness of the thermoplastic resin film for connection, to a thickness of each of the first thermoplastic resin film and the second thermoplastic resin film, is from 0.8 to 1.2.

(9) The welded film according to any one of (1) to (8), wherein each of the first thermoplastic resin film, the second thermoplastic resin film, and the thermoplastic resin film for connection independently contains at least one selected from the group consisting of a fluororesin, a polyester resin, and a polyolefin resin.

(10) A method of producing a welded film, the method including:

preparing a temporary arrangement body in which a thermoplastic resin film for connection spans between a first thermoplastic resin film and a second thermoplastic resin film; and performing thermocompression bonding on the temporary arrangement body with a first heater disposed outside the thermoplastic resin film for connection and a second heater disposed outside the first thermoplastic resin film and the second thermoplastic resin film, to form a first welded portion at which the first thermoplastic resin film and the thermoplastic resin film for connection are welded to each other and a second welded portion at which the second thermoplastic resin film and the thermoplastic resin film for connection are welded to each other, wherein at least one selected from the group consisting of the first heater and the second heater is configured not to come into contact with a portion between the first welded portion and the second welded portion during the thermocompression bonding.

(11) The method of producing a welded film according to (10), wherein:

at least one selected from the group consisting of the first heater and the second heater has a recess on a thermocompression bonding surface, and in the thermocompression bonding, the thermocompression bonding surface forms the first welded portion on an inner side of an end portion of the first thermoplastic resin film, at a side of the second thermoplastic resin film, and forms a second welded portion on an inner side of an end portion of the second thermoplastic resin film, at a side of the first thermoplastic resin film, and the portion between the first welded portion and the second welded portion is maintained by the recess without being welded.

(12) The method of producing a welded film according to (11), wherein the recess in the at least one selected from the group consisting of the first heater and the second heater has a depth of 0.2 mm or more.

(13) The method of producing a welded film according to (11) or (12), wherein the recess in the at least one selected from the group consisting of the first heater and the second heater has a width of 2.0 mm or more.

(14) The welded film according to any one of (1) to (9), or a welded film produced by the method according to any one of (10) to (13), the welded film being an agricultural film or a film for a membrane structure.

Advantageous Effects of Invention

According to the present disclosure, a welded film of which tearing at a connection portion is suppressed, and a method of producing the welded film are provided.

BRIEF DESCRIPTION OF DRAWINGS

FIG. 5A(b) is a schematic sectional view of a first heater, a second heater, and a welded film used for a second thermocompression bonding in a conventional method of producing a welded film.

FIG. 5B(b) is a schematic sectional view of a first heater, a second heater, and a welded film used for a second thermocompression bonding in an aspect of a method of producing a welded film.

FIG. 5C(b) is a schematic sectional view of a first heater, a second heater, and a welded film used for a second thermocompression bonding in an aspect of a method of producing a welded film.

DESCRIPTION OF EMBODIMENTS

Figure 1:
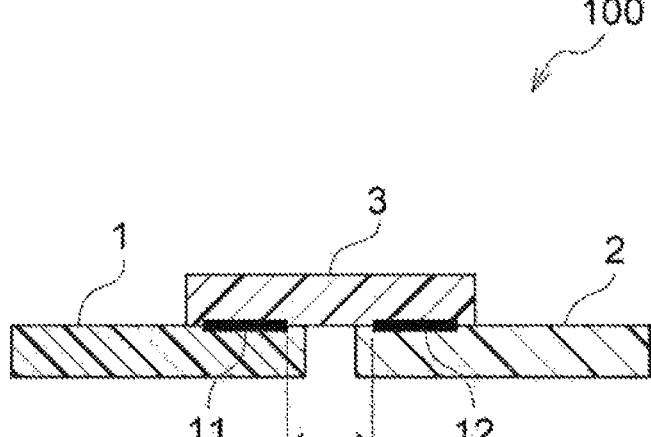
FIG. 1 is a schematic sectional view of a welded film for describing a first embodiment.

Forms for carrying out the embodiments of the present disclosure will be described below in detail. However, embodiments of the present disclosure are not limited to the following embodiments. In the following embodiments, components (including elemental steps, etc.) thereof are not essential unless otherwise specified. The same applies to numerical values and ranges, which do not limit the present disclosure.

In the present disclosure, the term "step" encompasses an independent step separated from other steps as well as a step that is not clearly separated from other steps, as long as a purpose of the step can be achieved.

In the present disclosure, a numerical range specified using "(from) . . . to . . . " represents a range including the numerical values noted before and after "to" as a minimum value and a maximum value, respectively.

In the present disclosure, each component may include plural substances corresponding to the component. In a case in which plural substances corresponding to a component are present in a composition, an amount or content of each component means the total amount or content of the plural substances present in the composition unless otherwise specified.

In a case in which an embodiment is described herein with reference to a drawing, the configuration of the embodiment is not limited by the configuration illustrated in the drawing. The sizes of members in respective drawings are conceptual, and the relative relationships between the sizes of the members are not limited thereto.

In the present disclosure, "unit" of a polymer means a moiety derived from a monomer that is present in the polymer and constitutes the polymer. A unit obtained by chemically converting the structure of a certain unit after forming a polymer is also referred to as "unit". In some cases, a unit derived from each monomer is referred to by a name in which "unit" is added to the name of the monomer.

In the present disclosure, films and sheets are referred to as "films" regardless of their thickness.

In the present disclosure, "welded portion" refers to an area in which two or more thermoplastic resin films are welded by heat. An area in which two or more thermoplastic resin films are in contact with each other but are not welded is not included in the welded portion. A welded portion and an unwelded portion of a welded film can be determined based on the fact that, when the welded film is bent by 90° with the thermoplastic resin film for connection facing inside, the first and second thermoplastic resin films at the unwelded portions are not bent together with the thermoplastic resin film for connection.

In the present disclosure, "connection portion" represents an area at and around the part connecting the plural thermoplastic resin films, including a welded portion.

In the present disclosure, "sectional view of a connection portion" of a welded film means a view illustrating a cut surface of the connection portion of the welded film cut along an alignment direction of a first thermoplastic resin film and a second thermoplastic resin film, and is, for example, a sectional view illustrated in each of FIGS. 1 to 3 and FIGS. 5A to 5C.

In the present disclosure, the "width" of a film or a portion thereof means a length thereof in a direction along the arrangement direction of the first thermoplastic resin film and the second thermoplastic resin film.

In the present disclosure, "melting point" means a temperature corresponding to the maximum value of the melting peak measured by a differential scanning calorimetry (DSC) method.

In the present disclosure, the film according to the first to third embodiments may sometimes be collectively referred to as "film according to the present disclosure".

Welded Film

A welded film according to a first embodiment of the present disclosure includes at least a first thermoplastic resin film, a second thermoplastic resin film, and a thermoplastic resin film for connection disposed so as to span between the first thermoplastic resin film and the second thermoplastic resin film, wherein: the first thermoplastic resin film and the thermoplastic resin film for connection are welded at a first welded portion, and the second thermoplastic resin film and the thermoplastic resin film for connection are welded at a second welded portion, and the minimum distance between the first welded portion and the second welded portion is 2.0 mm or more.

FIG. 1 illustrates a welded film according to the first embodiment. FIG. 1 is a sectional view of a connection portion of a welded film 100. The welded film 100 of FIG. 1 includes a first thermoplastic resin film 1, a second thermoplastic resin film 2, and a thermoplastic resin film for connection 3 disposed so as to span between the first thermoplastic resin film 1 and the second thermoplastic resin film 2, wherein: the first thermoplastic resin film 1 and the thermoplastic resin film for connection 3 are welded at a first welded portion 11, and the second thermoplastic resin film 2 and the thermoplastic resin film for connection 3 are welded at a second welded portion 12. The minimum distance $D_1$ between the first welded portion 11 and the second welded portion 12 is 2.0 mm or more.

In general, the elongation degree of a connection portion of plural films is lowered. However, in the welded film according to the present embodiment, since the minimum distance $D_1$ of 2.0 mm or more between the first welded portion 11 and the second welded portion 12 is secured, it is considered that the film elongation degree between the first welded portion 11 and the second welded portion 12 is maintained, and that the welded film 100 is less likely to tear at the connection portion even when stretched for a long time.

A welded film according to a second embodiment of the present disclosure includes at least a first thermoplastic resin film, a second thermoplastic resin film, and a thermoplastic resin film for connection disposed so as to span between the first thermoplastic resin film and the second thermoplastic resin film, wherein: the first thermoplastic resin film and the thermoplastic resin film for connection are welded at a first welded portion, and the second thermoplastic resin film and the thermoplastic resin film for connection are welded at a second welded portion, and the positional relationship between the first thermoplastic resin film or the second thermoplastic resin film, and the first welded portion or the second welded portion, satisfies at least one selected from the group consisting of the following (i) and (ii).

(i) The minimum distance between the end portion of the first thermoplastic resin film at the side of the second thermoplastic resin film and the first welded portion is 0.5 mm or more.

(ii) The minimum distance between the end portion of the second thermoplastic resin film at the side of the first thermoplastic resin film and the second welded portion is 0.5 mm or more.

Figure 2:
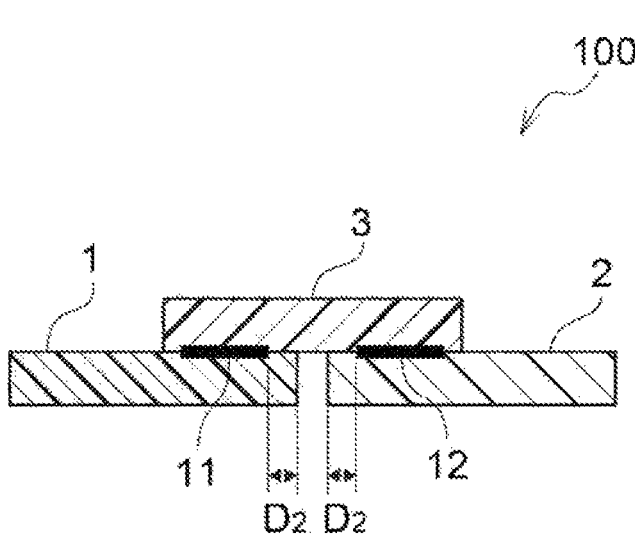
FIG. 2 is a schematic sectional view of a welded film for describing a second embodiment.

FIG. 2 illustrates a welded film according to the second embodiment. FIG. 2 is a sectional view of a connection portion of the welded film 100. The welded film 100 of FIG. 2 includes a first thermoplastic resin film 1, a second thermoplastic resin film 2, and a thermoplastic resin film for connection 3 disposed so as to span between the first thermoplastic resin film 1 and the second thermoplastic resin film 2, wherein: the first thermoplastic resin film 1 and the thermoplastic resin film for connection 3 are welded at a first welded portion 11, and the second thermoplastic resin film 2 and the thermoplastic resin film for connection 3 are welded at a second welded portion 12. Here, the positional relationship between the first thermoplastic resin film 1 or the second thermoplastic resin film 2 and the first welded portion 11 or the second welded portion 12 satisfies at least one selected from the group consisting of the following (i) and (ii).

(i) The minimum distance between the end portion of the first thermoplastic resin film 1 on the second thermoplastic resin film 2 side and the first welded portion 11 is 0.5 mm or more.

(ii) The minimum distance between the end portion of the second thermoplastic resin film 2 on the first thermoplastic resin film 1 side and the second welded portion 12 is 0.5 mm or more.

Since $D_2$ of 0.5 mm or more is secured in at least one selected from the group consisting of the first thermoplastic resin film 1 and the second thermoplastic resin film 2, it is considered that a tear (hereinafter, also referred to as "notch") is less likely to be generated at the end portion of the first thermoplastic resin film 1 or the end portion of the second thermoplastic resin film 2, corresponding to the at least one film, and as a result, the tearing of the welded film 100 can be suppressed.

A welded film according to a third embodiment of the present disclosure includes at least a first thermoplastic resin film, a second thermoplastic resin film, and a thermoplastic resin film for connection disposed so as to span between the first thermoplastic resin film and the second thermoplastic resin film, wherein: the first thermoplastic resin film and the thermoplastic resin film for connection are welded at a first welded portion, and the second thermoplastic resin film and the thermoplastic resin film for connection are welded at a second welded portion, and the positional relationship between the first welded portion and the second welded portion satisfies at least one selected from the group consisting of $0<(L_{1b}/L_{1a})<0.99$ and $0<(L_{2b}/L_{2a})<0.99$, wherein:

$L_{1b}$ represents a width of the first welded portion, $L_{1a}$ represents a total length obtained by adding the minimum distance from the end portion of the first thermoplastic resin film, at the side of the second thermoplastic resin film, to the first welded portion, to the width $L_{1b}$ of the first welded portion, $L_{2b}$ represents a width of the second welded portion, and $L_{2a}$ represents a total length obtained by adding the minimum distance from the end portion of the second thermoplastic resin film, at the side of the first thermoplastic resin film, to the second welded portion, to the width $L_{2b}$ of the second welded portion.

Figures 3, 4:
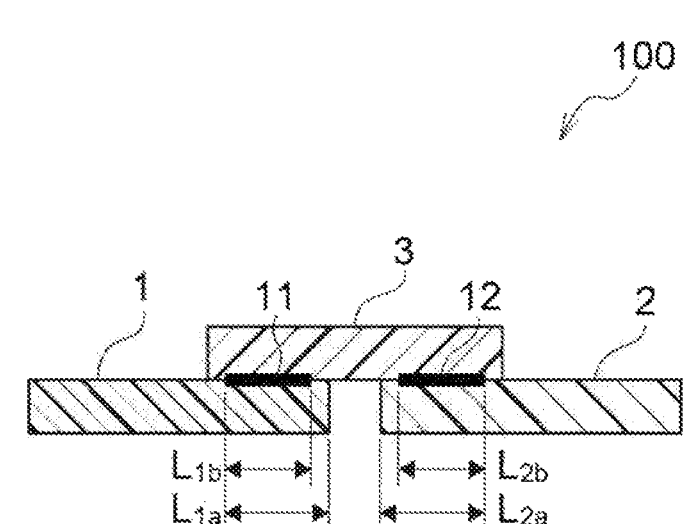
FIG. 3 is a schematic sectional view of a welded film for describing a third embodiment.
FIG. 4 is a schematic sectional view of an example of a thermocompression bonding machine used for producing a welded film.

FIG. 3 illustrates a welded film according to the third embodiment. FIG. 3 is a sectional view of a connection portion of the welded film 100. The welded film 100 of FIG. 3 includes a first thermoplastic resin film 1, a second thermoplastic resin film 2, and a thermoplastic resin film for connection 3 disposed so as to span between the first thermoplastic resin film 1 and the second thermoplastic resin film 2, wherein the first thermoplastic resin film 1 and the thermoplastic resin film for connection 3 are welded at a first welded portion 11, and the second thermoplastic resin film 2 and the thermoplastic resin film for connection 3 are welded at a second welded portion 12. Here, the positional relationship between the first welded portion 11 and the second welded portion 12 satisfies at least one selected from the group consisting of $0<(L_{1b}/L_{1a})<0.99$ and $0<(L_{2b}/L_{2a})<0.99$.

By the welded film 100 satisfying at least one selected from the group consisting of $0<(L_{1b}/L_{1a})<0.99$ and $0<(L_{2b}/L_{2a})<0.99$, it is considered that a tear (that is, notch) is less likely to be generated at the end portion of the first thermoplastic resin film 1 or the end portion of the second thermoplastic resin film 2, and as a result, the tearing of the welded film 100 can be suppressed.

The inventor has focused on the problem that conventional welded films tear in some occasions when stretched for a long time, and investigated the cause thereof to find that the tearing occurs at a connection portion as a starting point, by the welded film undergoing repeated vibrations owing to wind or the like. It is presumed that one reason for this is that the thickness of the connection portion of the welded film becomes thin owing to the heat during the welding, and the strength thereof becomes insufficient. Thus, to suppress the lowing of the strength of the connection portion, the inventor studied the welding method and invented the welded films according to the first to third embodiments.

Plural thermoplastic resin films can be connected by disposing a thermoplastic resin film for connection so as to span between a first thermoplastic resin film and a second thermoplastic resin film, and welding the thermoplastic resin film for connection to the first thermoplastic resin film and the second thermoplastic resin film. The welded film according to the present disclosure may be not only one in which the first thermoplastic resin film and the second thermoplastic resin film, as films before connection, are connected, but also one in which three or more thermoplastic resin films are connected, using thermoplastic resin films for connection. The number of the thermoplastic resin films before connection (excluding the number of thermoplastic resin films for connection) may be appropriately set according to the application thereof, and may be, for example, from 2 to 100, from 2 to 50, or from 2 to 10.

In the welded film according to the present disclosure, the thermoplastic resin film for connection is welded to the first thermoplastic resin film via the first welded portion, and welded to the second thermoplastic resin film via the second welded portion, whereby the first thermoplastic resin film and the second thermoplastic resin film are connected. The first welded portion and the second welded portion are on the same side of the thermoplastic resin film for connection. For example, while welding tends to be insufficient on a hydro-philized surface of a thermoplastic resin film that has been subjected to a hydrophilization treatment, according to the configuration of the present disclosure, a firmly connected welded film can be obtained, for example, with a thermo-plastic resin film that has been subjected to a hydrophiliza-tion treatment on one side, by the thermoplastic resin film for connection being welded to the other side of the ther-moplastic resin film.

The first thermoplastic resin film, the second thermoplas-tic resin film, and the thermoplastic resin film for connection (hereinafter, these are also collectively and simply referred to as "thermoplastic resin film") contain a thermoplastic resin. The material of the first thermoplastic resin film, the second thermoplastic resin film, and the thermoplastic resin film for connection may be the same as or different from each other, and are preferably the same from the viewpoint of further suppressing the tearing owing to the differences in the elongation degree and strength depending on the loca-tions.

Examples of the thermoplastic resin include an amor-phous resin and a crystalline resin.

Examples of the amorphous resin include polystyrene, polyvinyl chloride, polycarbonate, and polymethyl meth-acrylate.

Examples of the crystalline resin include a fluororesin, a polyester resin, and a polyolefin resin.

Examples of the fluororesin include an ethylene-tetrafluo-roethylene copolymer (hereinafter, also referred to as "ETFE"), a perfluoro(alkylvinylether)-tetrafluoroethylene copolymer (hereinafter, also referred to as "PFA"), a hexafluoropropylene-tetrafluoroethylene copolymer (herein-after, also referred to as "FEP"), a chlorotrifluoroethylene polymer (hereinafter, also referred to as "PCTFE"), a vinyl fluoride polymer (hereinafter, also referred to as "PVDF"), a vinylidene fluoride polymer (hereinafter, also referred to as "PVF"), a vinylidene fluoride-hexafluoropropylene copoly-mer, a tetrafluoroethylene-hexafluoropropylene-vinylidene fluoride copolymer, a tetrafluoroethylene-propylene copoly-mer, a tetrafluoroethylene-vinylidene fluoride-propylene copolymer, an ethylene-chlorotrifluoroethylene copolymer, and a propylene-chlorotrifluoroethylene copolymer. Each of these fluororesins may further include another unit.

Examples of the polyester resin include a polyethylene terephthalate resin, a polybutylene terephthalate resin, and a polylactic acid resin.

Examples of the polyolefin resin include polyethylene, an ethylene-α-olefin copolymer, an ethylene-vinyl acetate copolymer, an ethylene-vinyl alcohol copolymer, polypro-pylene, and an ethylene-propylene copolymer. Each of these polyolefin resins may further include another unit.

From the viewpoint of excellent scratch resistance, chemical resistance, and the like, and from the viewpoint of easily obtaining high strength by stretching and the like, the thermoplastic resin is preferably a crystalline resin. That is, the thermoplastic resin film is preferably a crystalline resin film.

Among crystalline resins, from the viewpoint of excellent weather resistance and chemical resistance, a fluororesin is preferable. That is, the thermoplastic resin film is preferably a fluororesin film.

Among fluororesins, from the viewpoint of excellent weather resistance, specific gravity, and price, at least one selected from the group consisting of ETFE, PFA, FEP, PCTFE, PVDF, and PVF is preferable, at least one selected from the group consisting of ETFE, PFA, and FEP is more preferable, and ETFE is particularly preferable.

The thermoplastic resin film may further contain a com-ponent other than the thermoplastic resin as necessary. Examples of the "other component" include a flame retar-dant, an ultraviolet light absorber, an ultraviolet ray blocking agent, a filler, and a pigment.

The thermoplastic resin film may be one that has been subjected to a hydrophilization treatment on one side or both sides thereof, or may be one that has not been subjected to a hydrophilization treatment. By performing a hydrophiliza-tion treatment, liquid flowability can be improved, for example. In a case of producing a welded film having a hydrophilized surface, it is preferable that each of the first and second thermoplastic resin films is one that has been subjected to a hydrophilization treatment on one side, and that the first and second thermoplastic resin films are welded to the thermoplastic resin film for connection on the side that has not been subjected to the hydrophilization treatment, from the viewpoint of sufficiently performing the welding.

Examples of the hydrophilization treatment method include a wet method and a dry method.

Examples of the wet method include a method in which a solution of a hydrophilic substance is applied by a roller, a method in which the solution is applied by spray coating, a method in which the solution is applied by a brush, and a method in which the solution is applied by a coating machine. Among these, a method of coating a solution of a hydrophilic substance with a coating machine or a method of coating a solution of a hydrophilic substance with a spray is preferable.

Examples of the dry method include a sputtering method, a vacuum vapor deposition method, a CVD method, and an ion plating method of a hydrophilic substance. From the viewpoint of high productivity and excellent sustainability of hydrophilicity, a sputtering method of a hydrophilic substance is preferable.

Examples of the hydrophilic substance include an inor-ganic colloid sol of $SiO_2$, $Al_2O_3$, or the like, a hydrophilic resin such as polyvinyl alcohol or acrylic acid, and an oxide of a metal such as Si, Sn, Ti, Nb, Al or Zn.

In particular, a sputtering method with an oxide of a metal such as Si, Sn, or Ti is preferable. In this case, it is more preferable to use an oxide of a metal of Si and/or Sn.

The thickness of the thermoplastic resin film may be appropriately set according to the application, and the thick-ness may be from 10 to 1000 μm, may be from 20 to 800 μm, or may be from 30 to 500 μm.

In an aspect, from the viewpoint of further suppressing the tearing of the welded film at the connection portion, the ratio of the thickness of the thermoplastic resin film for connec-tion to the thickness of each of the first thermoplastic resin film and the second thermoplastic resin film is preferably from 0.8 to 1.2, and more preferably from 0.9 to 1.1. One reason is presumably that, by the thickness of each of the first and second thermoplastic resin films to be connected and the thickness of the thermoplastic resin film for con-nection being relatively close to each other, even when a tensile stress is applied to the welded film, concentration of the stress at a particular location is suppressed. In addition, another reason is presumably that, when the thicknesses of the first and second thermoplastic resin films to be connected and the thickness of the thermoplastic resin film for con-nection are relatively close, the temperature of the heater in the side of the first and second thermoplastic resin films and the temperature of the heater in the side of the thermoplastic resin film for connection at the time of the welding can be easily set to be close to each other, whereby the temperature of the welding interface tends to be stabilized.

The width of the first and second thermoplastic resin films before the welding may be appropriately set according to the applications thereof, manufacturing facilities, and the like, and the width may be from 0.5 to 3 m, from 0.8 to 2.5 m, or from 1.1 to 1.6 m.

The width of the thermoplastic resin film for connection is not particularly limited. From the viewpoint of securing a sufficient welded portion, the width of the thermoplastic resin film for connection is preferably 10 mm or more, more preferably 20 mm or more, and still more preferably 30 mm or more. From the viewpoint of downsizing the device used for the welding, the width of the thermoplastic resin film for connection is preferably 100 mm or less, more preferably 50 mm or less, and still more preferably 40 mm or less.

The first welded portion and the second welded portion are typically positioned near the respective end portions of the first thermoplastic resin film and the second thermoplastic resin film. The width of the overlapping part of the first thermoplastic resin film and the thermoplastic resin film for connection is preferably from 5 to 50 mm, more preferably from 5 to 25 mm, and still more preferably from 5 to 15 mm. The same applies to the width of the overlapping part between the second thermoplastic resin film and the thermoplastic resin film for connection.

The thickness of the welded portion is not particularly limited. From the viewpoint of improving the film strength and the strength of the welded portion, the film thickness at the first welded portion is preferably from 80 to 100%, more preferably from 90 to 100%, and still more preferably from 95 to 100% of the total thickness of the first thermoplastic resin film and the thermoplastic resin film for connection before welding. The same applies to the film thickness at the second welded portion.

The size of each of the welded portions is not particularly limited. The width of each of the welded portions is, independently, preferably 3 mm or more, may be 5 mm or more, or may be 10 mm or more. From the viewpoint of downsizing the device used for the welding, the width of each of the welded portions is preferably 50 mm or less, more preferably 30 mm or less, and still more preferably 20 mm or less.

From the viewpoint of film strength, it is preferable that a certain area of the end portion of the thermoplastic resin film for connection remains unwelded. The width of the unwelded area at the end portion of the thermoplastic resin film for connection is preferably from 0.1 to 10 mm, more preferably from 0.3 to 5 mm, and still more preferably from 0.5 to 3 mm.

In the welded film according to the present disclosure, the minimum distance between the first welded portion and the second welded portion is preferably 2.0 mm or more. In the first embodiment of the present disclosure, the minimum distance between the first welded portion and the second welded portion is 2.0 mm or more.

From the viewpoint of the elongation degree of the connection portion, the foregoing minimum distance is more preferably 2.5 mm or more, and still more preferably 2.8 mm or more. From the viewpoint of excellent ease of handling of the welded film and the like, the foregoing minimum distance is preferably 10.0 mm or less, more preferably 8.0 mm or less, and still more preferably 6.0 mm or less.

In the welded film according to the present disclosure, the positional relationship between the first thermoplastic resin film or the second thermoplastic resin film, and the first welded portion or the second welded portion, preferably satisfies at least one selected from the group consisting of the following (i) and (ii).

(i) The minimum distance between the end portion of the first thermoplastic resin film at the side of the second thermoplastic resin film and the first welded portion is 0.5 mm or more.

(ii) The minimum distance between the end portion of the second thermoplastic resin film at the side of the first thermoplastic resin film and the second welded portion is 0.5 mm or more.

The welded film according to the second embodiment of the present disclosure satisfies the foregoing condition.

Each of the minimum distances in (i) and (ii) may independently be 0.7 mm or more or 0.9 mm or more. From the viewpoint that the unwelded portions at the end portions of the first and second thermoplastic resin films in the connection portion is less likely to affect ease of handling, the minimum distance in (i) and (ii) is preferably 10.0 mm or less, more preferably 5.0 mm or less, and still more preferably 3.0 mm or less.

In an aspect, the positional relationship between the first welded portion and the second welded portion preferably satisfies at least one selected from the group consisting of $0<(L_{1b}/L_{1a})<0.99$ and $0<(L_{2b}/L_{2a})<0.99$. In the formulas, $L_{1b}$ represents the width of the first welded portion, $L_{1a}$ represents a total length obtained by adding the minimum distance from the end portion of the first thermoplastic resin film, at the side of the second thermoplastic resin film, to the first welded portion, to the width $L_{1b}$ of the first welded portion, $L_{2b}$ represents the width of the second welded portion, and $L_{2a}$ represents a total length obtained by adding the minimum distance from the end portion of the second thermoplastic resin film, at the side of the first thermoplastic resin film, to the second welded portion, to the width $L_{2b}$ of the second welded portion.

In the third embodiment of the present disclosure, the welded film satisfies at least one selected from the group consisting of $0<(L_{1b}/L_{1a})<0.99$ and $0<(L_{2b}/L_{2a})<0.99$.

From the viewpoint of the strength of the welded portion, each of $(L_{1b}/L_{1a})$ and $(L_{2b}/L_{2a})$ is, independently, preferably 0.33 or more, more preferably 0.50 or more, and still more preferably 0.80 or more. $(L_{1b}/L_{1a})$ is preferably less than 0.99, and more preferably 0.95 or less. From the foregoing viewpoints, each of $(L_{1b}/L_{1a})$ and $(L_{2b}/L_{2a})$ is, independently, preferably from 0.33 or more and less than 0.99, more preferably from 0.50 to 0.95, and still more preferably from 0.80 to 0.95.

[Physical Properties of Welded Film]

(Tensile Elongation at Break)

From the viewpoint of favorably suppressing the tearing at the connection portion, the welded film according to the present disclosure preferably has a tensile elongation at break of the connection portion of 150% or more, as measured at a tensile speed of 200 mm/min using a dumbbell-shaped test piece having a gauge line distance of 40 mm in accordance with JIS K6732:2006. Specifically, the tensile elongation at break of the connection portion can be measured by the method in Examples. The tensile elongation at break of the connection portion is more preferably 180% or more, still more preferably 250% or more, and particularly preferably 280% or more. The upper limit value of the tensile elongation at break of the connection portion is not particularly limited, and from the viewpoint of the strength of the welded film, the tensile elongation at break of the connection portion is preferably 500% or less, more preferably 350% or less, still more preferably 280% or less.
(Tensile Strength)

From the viewpoint of being applicable to applications requiring high strength such as membrane structure applications, the tensile strength of the connection portion of the welded film is preferably 25 MPa or more, more preferably 30 MPa or more, and still more preferably 35 MPa or more. The upper limit of the tensile strength of the connection portion is not particularly limited, and is preferably as high as possible.

The "tensile strength" is a tensile breaking stress measured at a tensile speed of 200 mm/min using a dumbbell-shaped test piece having a gauge line distance of 40 mm according to JIS K6732:2006.

[Method of Producing Welded Film]

The method of producing the welded film is not particularly limited, and for example, a method may be adopted in which the first welded portion and the second welded portion are subjected to thermocompression bonding, while a portion between the first welded portion and the second welded portion is not subjected to thermocompression bonding.

In an aspect, a method of producing a welded film may include preparing a temporary arrangement body (hereinafter also referred to as "temporary arrangement body preparation step") in which a thermoplastic resin film for connection spans between a first thermoplastic resin film and a second thermoplastic resin film, and performing thermocompression bonding on the temporary arrangement body with a first heater disposed outside the thermoplastic resin film for connection and a second heater disposed outside the first thermoplastic resin film and the second thermoplastic resin film to form a first welded portion in which the first thermoplastic resin film and the thermoplastic resin film for connection are welded to each other and a second welded portion in which the second thermoplastic resin film and the thermoplastic resin film for connection are welded to each other (hereinafter also referred to as "thermocompression bonding step"), wherein at least one selected from the group consisting of the first heater and the second heater may be configured not to come into contact with a portion between the first welded portion and the second welded portion during the thermocompression bonding.

In the temporary arrangement body preparation step, a temporary arrangement body, formed by disposing the thermoplastic resin film for connection so as to span between the first thermoplastic resin film and the second thermoplastic resin film, is prepared. The "temporary arrangement body" is an arrangement body formed by disposing the thermoplastic resin film for connection so as to span between the first thermoplastic resin film and the second thermoplastic resin film, on which welding has not been performed. For the details of the first and second thermoplastic resin films and the thermoplastic resin film for connection, the matters described above can be applied. The positional relationship between the first and second thermoplastic resin films and the thermoplastic resin film for connection in the temporary arrangement body can be set such that the welded film to be produced has the above-described aspects.

In the thermocompression bonding step, the temporary arrangement body is subjected to thermocompression bonding by the first heater and the second heater to form the first welded portion in which the first thermoplastic resin film and the thermoplastic resin film for connection are welded, and the second welded portion in which the second thermoplastic resin film and the thermoplastic resin film for connection are welded. In the present disclosure, the heater disposed outside the thermoplastic resin film for connection at the time of thermocompression bonding is referred to as the "first heater" for convenience, and the heater disposed outside the first thermoplastic resin film and the second thermoplastic resin film is referred to as the "second heater" for convenience. For the details of the first welded portion and the second welded portion, the matters described above can be applied.

The thermocompression bonding may be performed in two or more steps. In an aspect, the thermocompression bonding includes a first thermocompression bonding and a second thermocompression bonding. The first thermocompression bonding and the second thermocompression bonding may be performed at the same temperature or at different temperatures. For example, after the first thermocompression bonding is performed, the second thermocompression bonding may be performed at a temperature lower than the temperature of the first thermocompression bonding. Two or more steps of thermocompression bonding allow adjusting the degree of welding place by place.

The thermocompression bonding is performed preferably in a range of from −10 to +20° C., more preferably in a range of from −8 to +15° C., and still more preferably in a range of from −5 to +10° C., of the melting point of the resin constituting the thermoplastic resin film. When the thermocompression bonding is performed in two or more steps, each thermocompression bonding is preferably performed within these ranges.

The pressure at the time of thermocompression bonding may be of the own weight of the heater, or a load may be further applied to increase the pressure. The pressure is preferably from 0.01 to 10 MPa, and more preferably from 0.1 to 1 MPa.

The thermocompression bonding may be performed using a release film to enhance releasability between each heater and the thermoplastic resin film.

It is also preferable to insert a cooling step after the thermocompression bonding. The cooling may be performed using a cooling plate or may be performed by air cooling. When a release film is used, the ease of peeling of the thermoplastic resin film from the release film is improved by inserting a cooling step.

It is also preferable that at least one selected from the group consisting of the first heater and the second heater has a recess on the thermocompression bonding surface, that, in the thermocompression bonding, the thermocompression bonding surface forms the first welded portion on an inner side of the end portion of the first thermoplastic resin film, at the side of the second thermoplastic resin film, and forms a second welded portion on an inner side of the end portion of the second thermoplastic resin film, at the side of the first thermoplastic resin film, and that the portion between the first welded portion and the second welded portion is maintained by the recess without being welded. For example, a comb-shaped heater may be used for at least one selected from the group consisting of the first heater and the second heater.

The depth of the recess is not particularly limited, and is preferably 0.2 mm or more and may be 0.3 mm or more, from the viewpoint of securing a sufficient depth so as not to contact the thermoplastic resin film to be welded. The upper limit of the depth of the recess is not particularly limited, and for example, the depth of the recess may be 100 mm or less.

From the viewpoint of the elongation degree of the connection part, the width of the recess is preferably 2.0 mm or more, more preferably 2.5 mm or more, and still more preferably 2.8 mm or more. From the viewpoint of ease of handling of the welded film and the like, the width of the recess is preferably 10.0 mm or less, more preferably 8.0 mm or less, and still more preferably 6.0 mm or less.

FIG. 4 illustrates an example of the steps in a case in which a welded film is produced by the first thermocompression bonding and the second thermocompression bonding. FIG. 4 is a schematic sectional view of a thermocompression bonding portion of a thermocompression bonding machine. The arrow represents the conveyance direction of the film. In the thermocompression bonding portion, a first heater 21 and a second heater 22 used in the first thermocompression bonding, a first heater 23 and a second heater 24 used in the second thermocompression bonding, and cooling plates 25 and 26, are provided in this order from the direction from which the thermoplastic resin film is conveyed. In the aspect of FIG. 4, a release film 27 is used to prevent adhesion between the thermocompression bonding machine and the thermoplastic resin film, and the thermoplastic resin film is conveyed using the release film. First, the thermoplastic resin film is subjected to thermocompression bonding by the first heater 21 and the second heater 22 in the first thermocompression bonding. The temperature of the first heater 21 and the second heater 22 in the first thermocompression bonding is, for example, from −10 to +20° C. of the melting point of the resin constituting the first and second thermoplastic resin films. Subsequently, the thermoplastic resin film is conveyed and subjected to thermocompression bonding by the first heater 23 and the second heater 24 in the second thermocompression bonding. The temperature of the first heater 23 and the second heater 24 in the second thermocompression bonding is, for example, from −10 to +20° C. of the melting point of the resin constituting the first and second thermoplastic resin films. In the first thermocompression bonding and the second thermocompression bonding, the temperatures of the first heater and the second heater may be the same as or different from each other. For example, when the thickness of the first thermoplastic resin film and the second thermoplastic resin film is different from the thickness of the thermoplastic resin film for connection, it is preferable to set the temperature of the heater on the side of the film having a larger thickness to be higher. Subsequently, the thermoplastic resin film is conveyed and cooled by the cooling plates 25 and 26.

Figure 5A:
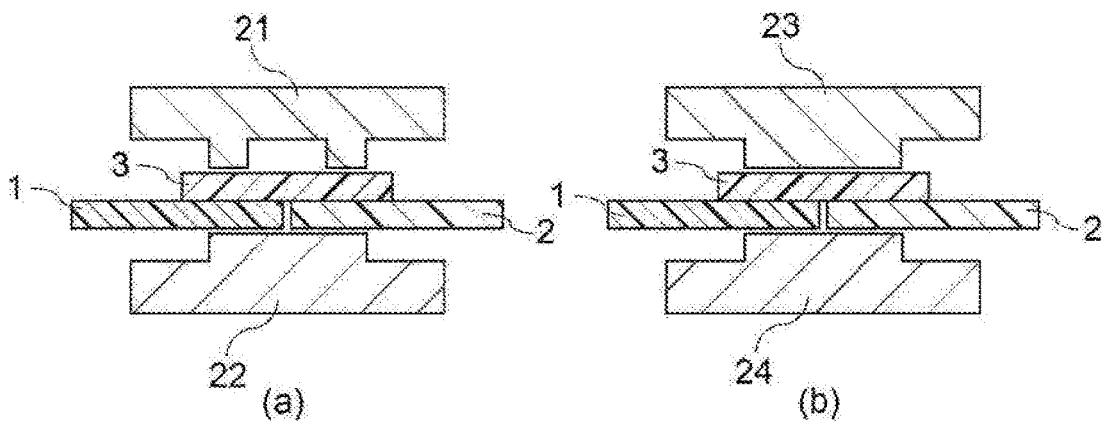
FIG. 5A(a) is a schematic sectional view of a first heater, a second heater, and a welded film used for a first thermocompression bonding in a conventional method of producing a welded film.
Figure 5B:
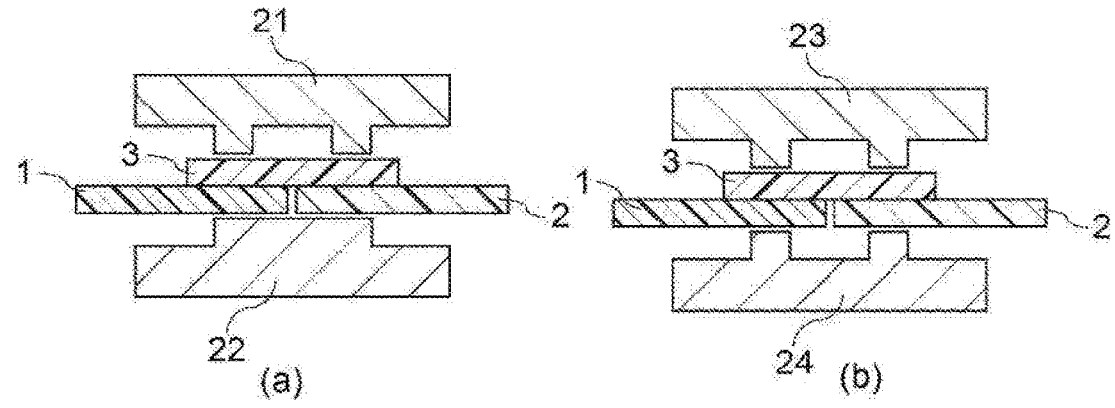
FIG. 5B(a) is a schematic sectional view of a first heater, a second heater, and a welded film used for a first thermocompression bonding in an aspect of a method of producing a welded film.
Figure 5C:
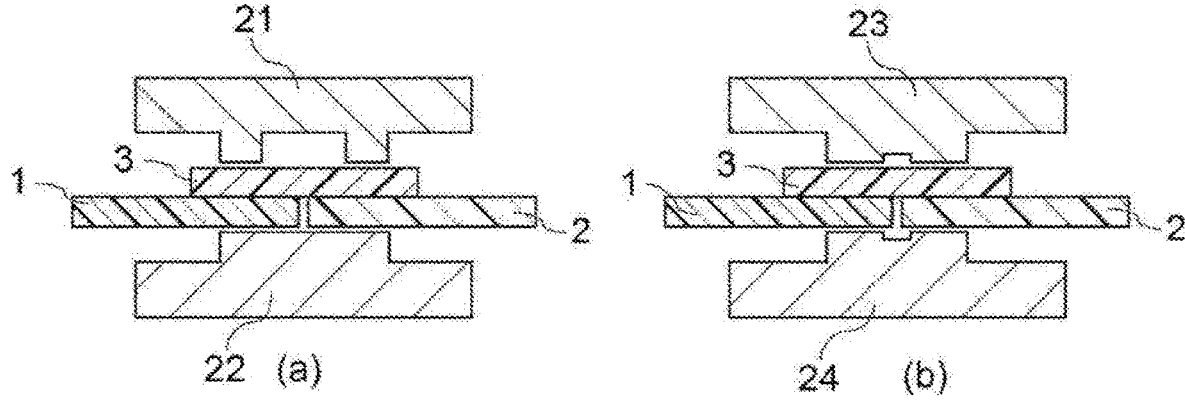
FIG. 5C(a) is a schematic sectional view of a first heater, a second heater, and a welded film used for a first thermocompression bonding in an aspect of a method of producing a welded film.

The shapes of the first heater 21 and the second heater 22 in the first thermocompression bonding may be, for example, the shapes illustrated in (a) in FIGS. 5A to 5C. By using the first heater 21 and the second heater 22 of these shapes, the thermoplastic resin films can be welded at the overlapping portion of the thermoplastic resin films.

The shapes of the first heater 23 and the second heater 24 in the second thermocompression bonding may be, for example, a comb shape illustrated in FIG. 5B(b) or FIG. 5C(b). By using the comb-shaped heater having a recess on a thermocompression bonding surface, the first welded portion and the second welded portion are formed, while the portion between the welded portions remain unwelded. FIG. 5A(b) is a conventional example, in which thermocompression bonding is performed on the area including the boundary between the first thermoplastic resin film 1 and the second thermoplastic resin film 2. In this case, the film thickness at the boundary becomes thin, and notches are easily formed.

[Application of Welded Film]

The application of the welded film according to the present disclosure is not particularly limited. For example, the welded film according to the present disclosure may be used for a film for a membrane structure (for example, an outer covering film for a membrane structure), an agricultural film (for example, a covering film for an agriculture greenhouse), and the like.

The membrane structure is a structure such as a roof, an outer wall, or a facility, that uses a film. Examples of the facility include a sports facility (e.g., a pool, a gymnasium, a tennis court, a soccer field), a warehouse, a meeting hall, an exhibition hall, and a horticulture facility (e.g., a greenhouse for horticulture, a greenhouse for agriculture).

EXAMPLES

Next, embodiments of the present disclosure will be specifically described with reference to Examples. However, the embodiments of the present disclosure are not limited to these Examples. Examples 1 and 2 are comparative examples, and Examples 3 and 4 are working examples.

Example 1

As the first thermoplastic resin film, the second thermoplastic resin film, and the thermoplastic resin film for connection, ETFE films (manufactured by AGC Inc., melting point: 260° C.) having thicknesses listed in Table 1 were used. The widths of each of the first and second thermoplastic resin films were 1.3 m, and the width of the thermoplastic resin film for connection was 32 mm.

A welded film for evaluation was produced at a temperature and a conveyance speed listed in Table 1 by using a hot plate-type continuous welding machine manufactured by Queen Light Electronic Industries Limited having the configuration illustrated in the schematic view of FIG. 4. As the first heater and the second heater in the first thermocompression bonding, those illustrated in FIG. 5A(a) were used, and as the first heater and the second heater in the second thermocompression bonding, those illustrated in FIG. 5A(b) were used. Details of each heater are described below.

First heater in first thermocompression bonding: comb-shaped heater (width 30 mm, width of recess 8 mm, depth of recess 5 mm)

Second heater in first thermocompression bonding: planar heater (width 30 mm)

First heater in second thermocompression bonding: planar heater (width 30 mm)

Second heater in second thermocompression bonding: planar heater (width 30 mm)

Example 2

A welded film for evaluation was produced in the same manner as in Example 1 except that the thickness of the thermoplastic resin film for connection, the temperature of each heater, and the conveyance speed were changed to those listed in Table 1.

Example 3

A welded film for evaluation was produced in the same manner as in Example 2 except that the first heater and the second heater in the second thermocompression bonding were changed.

As the first heater and the second heater in the first thermocompression bonding, those illustrated in FIG. 5B(a) were used, and as the first heater and the second heater in the second thermocompression bonding, those illustrated in FIG. 5B(b) were used. Details of each heater are described below.

First heater in first thermocompression bonding: comb-shaped heater (width 30 mm, width of recess 8 mm, depth of recess 5 mm)

Second heater in first thermocompression bonding: planar heater (width 30 mm)

First heater in second thermocompression bonding: comb-shaped heater (width 30 mm, width of recess 8 mm, depth of recess 5 mm)

Second heater in second thermocompression bonding: comb-shaped heater (width 30 mm, width of recess 8 mm, depth of recess 5 mm)

Example 4

A welded film for evaluation was produced in the same manner as in Example 2 except that the first heater and the second heater in the second thermocompression bonding were changed.

As the first heater and the second heater in the first thermocompression bonding, those illustrated in FIG. 5C(a) were used, and as the first heater and the second heater in the second thermocompression bonding, those illustrated in FIG. 5C(b) were used. Details of each heater are described below.

First heater in first thermocompression bonding: comb-shaped heater (width 30 mm, width of recess 8 mm, depth of recess 5 mm)

Second heater in first thermocompression bonding: planar heater (width 30 mm)

First heater in second thermocompression bonding: comb-shaped heater (width 30 mm, width of recess 3 mm, depth of recess 1 mm)

Second heater in second thermocompression bonding: comb-shaped heater (width 30 mm, width of recess 3 mm, depth of recess 1 mm)

[Measurement of Tensile Elongation at Break]

Figure 6:
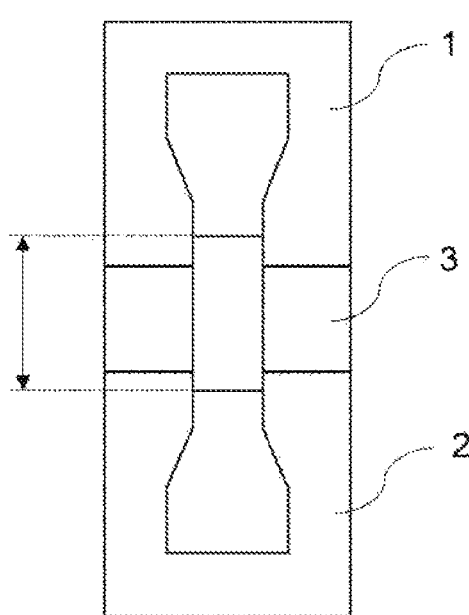
FIG. 6 is a schematic view of a dumbbell-shaped test piece used in measurement of tensile elongation at break in the Examples.

As illustrated in FIG. 6, a dumbbell-shaped (type 1) test piece having a gauge line distance (length of the double arrow in FIG. 6) of 40 mm was cut out from the welded film obtained in each of the Examples in such a manner that the welded portion is located at the center. The tensile elongation at break of the connection portion of the welded film was measured at a tensile speed of 200 mm/min according to JIS K 6732:2006 by using a universal tensile tester manufactured by Orientec Corporation.

The retention rate of tensile elongation at break was calculated using the obtained tensile elongation at break by the following formula.

$$\text{Retention rate of tensile elongation at break } (\%) = \text{tensile elongation at break } (\%) \text{ of connection portion/tensile elongation at break } (\%) \text{ of first thermoplastic resin film before welding} \times 100$$

The tensile elongation at break of the first thermoplastic resin film before the welding was 409.7%.

[Evaluation of Turning-Up of Unwelded Portion]

For the welded films obtained in the Examples, welded films in which the first and second thermoplastic resin films did not easily turn up at the unwelded portion were evaluated as A, and welded films in which the first and second thermoplastic resin films easily turned up were evaluated as B.

[Repeated Load Application Test]

A rectangular test piece having a length of 300 mm and a width of 50 mm was cut out from the welded film produced in each of the Examples in such a manner that the connection portion is located at the center. A cut of 2 mm was formed in each of both ends of the first welded portion and the second welded portion, a tensile load was repeatedly applied to the welded film at 5 times/second by using an air-resistance fatigue tester (manufactured by AGC Inc.), and the number of load applications until the break of the welded film was observed. The tensile load was a load that caused the welded film to elongate by around 3% (length of the evaluation portion of the welded film: 223 mm before application of the load, and 230 mm after application of the load).

Evaluation was performed by the following criteria.

A: The number of load applications until break was 1,000,000 or more

B: The number of load applications until break was from 500,000 or more and less than 1,000,000

C: The number of load applications until break was less than 500,000

TABLE 1

|  | Example | | | |
|---|---|---|---|---|
|  | 1 | 2 | 3 | 4 |
| Thickness of each of first and second thermoplastic resin films (µm) | 100 | 100 | 100 | 100 |
| Thickness of thermoplastic resin film for connection (µm) | 150 | 100 | 100 | 100 |
| Temperature of first heater in first thermocompression bonding (° C.) | 279 | 260 | 260 | 260 |
| Temperature of second heater in first thermocompression bonding (° C.) | 269 | 260 | 260 | 260 |
| Temperature of first heater in second thermocompression bonding (° C.) | 255 | 258 | 258 | 258 |
| Temperature of second heater in second thermocompression bonding (° C.) | 255 | 258 | 258 | 258 |
| Conveyance speed (m/min) | 3.0 | 3.4 | 3.4 | 3.4 |
| Distance between welded portions (mm) | 0 | 0 | 8 | 3 |
| End portion-welded portion distance (mm) | 0 | 0 | 4 | 1 |
| $L_{1a}$ (mm) | 13 | 13 | 9 | 14 |
| $L_{1b}$ (mm) | 13 | 13 | 5 | 13 |
| $L_{1b}/L_{1a}$ | 1.00 | 1.00 | 0.56 | 0.93 |
| Tensile elongation at break before welding (%) | 409.7 | 409.7 | 409.7 | 409.7 |
| Tensile elongation at break of connection portion (%) | 103.3 | 106.6 | 304.2 | 263.1 |
| Retention rate of tensile elongation at break of connection portion (%) | 25.2 | 26.0 | 74.2 | 64.2 |
| Turning-up of unwelded portion | A | A | B | A |
| Tearing at connection portion | C | C | A | A |
| (number of load applications until break) | (around 150,000 times) | (around 280,000 times) | (>1,000,000 times) | (>1,000,000 times) |

In Table 1, "Distance between welded portions" refers to the minimum distance between the first welded portion and the second welded portion. "End portion-welded portion distance" refers to the minimum distance between the end portion of the first thermoplastic resin film, at the side of the second thermoplastic resin film, and the first welded portion. Here, the shape of the connection portion is symmetrical about the connection portion.

In Example 1, occurrence of a notch phenomenon was observed, and a break occurred at around 150,000 times in the repeated load application test. The retention rate of tensile elongation at break of the connection portion also showed a low value. In Example 1, since the thermoplastic resin film for connection was thicker than the first and second thermoplastic resin films, the set temperature of the first heater in the side of the thermoplastic resin film for connection was higher than the set temperature of the second heater in the side of the first and second thermoplastic resin films. It is presumed that the notch phenomenon occurred relatively easily because the temperature of the welding interface during the welding was hard to be stabilized.

In Example 2, occurrence of a notch phenomenon was observed, and a break occurred at 280,000 times in the repeated load application test. The retention rate of tensile elongation at break of the connection portion also showed a low value. In Example 2, although the thickness of the thermoplastic resin film for connection was the same as the thickness of the first and second thermoplastic resin films, the heat was applied to the entire connection portion, and thus, it is presumed that the film thickness became thin at the boundary between the first thermoplastic resin film and the second thermoplastic resin film, and the notch phenomenon occurred.

In Examples 3 and 4, break did not occur even the number of load applications exceeded 1,000,000 in the repeated load application test. The retention rate of tensile elongation at break of the connection portion also showed a high value. In Examples 3 and 4, since both the first thermocompression bonding and the second thermocompression bonding were performed by comb-shaped heaters, it is presumed that the occurrence of a notch phenomenon in the gap between the first thermoplastic resin film and the second thermoplastic resin film was suppressed. Example 4, in which no turning-up of the unwelded portions was observed, was particularly favorable.

The disclosure of Japanese Patent Application No. 2021-043917 is incorporated herein by reference in its entirety.

All documents, patent applications, and technical standards described in the present specification are incorporated herein by reference to the same extent as in a case in which each document, patent application, and technical standard is specifically and individually indicated to be incorporated by reference.

REFERENCE SIGNS LIST

1 First thermoplastic resin film
2 Second thermoplastic resin film
3 Thermoplastic resin film for connection
11 First welded portion
12 Second welded portion
21 First heater in first thermocompression bonding
22 Second heater in first thermocompression bonding
23 First heater in second thermocompression bonding 24 Second heater in second thermocompression bonding
25 Cooling plate
26 Cooling plate
27 Release film
100 Welded film

The invention claimed is:

1. A welded film, comprising:

a first thermoplastic resin film;

a second thermoplastic resin film; and a thermoplastic resin film for connection disposed so as to span between the first thermoplastic resin film and the second thermoplastic resin film, wherein:

the first thermoplastic resin film and the thermoplastic resin film for connection are welded at a first welded portion, and the second thermoplastic resin film and the thermoplastic resin film for connection are welded at a second welded portion, a minimum distance between the first welded portion and the second welded portion being 10.0 mm or less, and a positional relationship between the first thermoplastic resin film or the second thermoplastic resin film, and the first welded portion or the second welded portion, satisfies at least one selected from the group consisting of the following (i) and (ii):

(i) a minimum distance between an end portion of the first thermoplastic resin film at a side of the second thermoplastic resin film and the first welded portion is 0.5 mm or more; and (ii) a minimum distance between an end portion of the second thermoplastic resin film at a side of the first thermoplastic resin film and the second welded portion is 0.5 mm or more.

2. The welded film according to claim 1, wherein a positional relationship between the first welded portion and the second welded portion satisfies at least one selected from the group consisting of $0<(L_{1b}/L_{1a})<0.99$ and $0<(L_{2b}/L_{2a})<0.99$, wherein:

$L_{1b}$ represents a width of the first welded portion, $L_{1a}$ represents a total length obtained by adding a minimum distance from an end portion of the first thermoplastic resin film, at the side of the second thermoplastic resin film, to the first welded portion, to the width $L_{1b}$ of the first welded portion, $L_{2b}$ represents a width of the second welded portion, and $L_{2a}$ represents a total length obtained by adding a minimum distance from an end portion of the second thermoplastic resin film, at the side of the first thermoplastic resin film, to the second welded portion, to the width $L_{2b}$ of the second welded portion.

3. The welded film according to claim 1, wherein a connection portion has a tensile elongation at break of 150% or more as measured at a tensile speed of 200 mm/min using a dumbbell-shaped test piece having a gauge line distance of 40 mm in accordance with JIS K6732:2006.

4. The welded film according to claim 1, wherein a ratio of a thickness of the thermoplastic resin film for connection, to a thickness of each of the first thermoplastic resin film and the second thermoplastic resin film, is from 0.8 to 1.2.

5. The welded film according to claim 1, wherein each of the first thermoplastic resin film, the second thermoplastic resin film, and the thermoplastic resin film for connection independently contains at least one selected from the group consisting of a fluororesin, a polyester resin, and a polyolefin resin.

6. The welded film according to claim 1, the welded film being an agricultural film or a film for a membrane structure.

7. The welded film according to claim 1, wherein the minimum distance between the first welded portion and the second welded portion is from 2.0 mm to 10.0 mm.

8. The welded film according to claim 1, wherein a width of each of the first welded portion and the second welded portion is 5 mm or more.

9. A welded film, comprising:

a first thermoplastic resin film;

a second thermoplastic resin film; and a thermoplastic resin film for connection disposed so as to span between the first thermoplastic resin film and the second thermoplastic resin film, wherein:

the first thermoplastic resin film and the thermoplastic resin film for connection are welded at a first welded portion, and the second thermoplastic resin film and the thermoplastic resin film for connection are welded at a second welded portion, a minimum distance between the first welded portion and the second welded portion being 10.0 mm or less, and a positional relationship between the first welded portion and the second welded portion satisfies at least one selected from the group consisting of $0 < (L_{1b}/L_{1a}) < 0.99$ and $0 < (L_{2b}/L_{2a}) < 0.99$, wherein:

$L_{1b}$ represents a width of the first welded portion, $L_{1a}$ represents a total length obtained by adding a minimum distance from an end portion of the first thermoplastic resin film, at a side of the second thermoplastic resin film, to the first welded portion, to the width $L_{1b}$ of the first welded portion, $L_{2b}$ represents a width of the second welded portion, and $L_{2a}$ represents a total length obtained by adding a minimum distance from an end portion of the second thermoplastic resin film, at a side of the first thermoplastic resin film, to the second welded portion, to the width $L_{2b}$ of the second welded portion.

10. The welded film according to claim 9, wherein a connection portion has a tensile elongation at break of 150% or more as measured at a tensile speed of 200 mm/min using a dumbbell-shaped test piece having a gauge line distance of 40 mm in accordance with JIS K6732:2006.

11. The welded film according to claim 9, wherein a ratio of a thickness of the thermoplastic resin film for connection, to a thickness of each of the first thermoplastic resin film and the second thermoplastic resin film, is from 0.8 to 1.2.

12. The welded film according to claim 9, wherein each of the first thermoplastic resin film, the second thermoplastic resin film, and the thermoplastic resin film for connection independently contains at least one selected from the group consisting of a fluororesin, a polyester resin, and a polyolefin resin.

13. The welded film according to claim 9, the welded film being an agricultural film or a film for a membrane structure.

14. The welded film according to claim 9, wherein the minimum distance between the first welded portion and the second welded portion is from 2.0 mm to 10.0 mm.

15. The welded film according to claim 9, wherein a width of each of the first welded portion and the second welded portion is 5 mm or more.

* * * * *